(12) United States Patent
Simske et al.

(10) Patent No.: US 7,673,807 B2
(45) Date of Patent: Mar. 9, 2010

(54) MULTIPLE RESOLUTION READABLE COLOR ARRAY

(75) Inventors: Steven J. Simske, Ft. Collins, CO (US); Guy Adams, Ft. Collins, CO (US); Jason S. Aronoff, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 11/709,407

(22) Filed: Feb. 21, 2007

(65) Prior Publication Data

US 2008/0197197 A1    Aug. 21, 2008

(51) Int. Cl.
*G06K 19/06* (2006.01)

(52) U.S. Cl. ............ 235/494; 235/462.01; 235/462.04; 235/487; 235/462.09

(58) Field of Classification Search .................................. 235/462.01–462.49, 494; 382/232–245
See application file for complete search history.

(56) References Cited

U.S. PATENT DOCUMENTS

| | | | |
|---|---|---|---|
| 4,979,049 A | 12/1990 | Chamzas | |
| 5,153,418 A | 10/1992 | Batterman et al. | |
| 5,223,701 A | 6/1993 | Batterman | |
| 5,241,166 A * | 8/1993 | Chandler | 235/494 |
| 5,369,261 A | 11/1994 | Shamir | |
| 5,638,496 A | 6/1997 | Sato | |
| 5,946,414 A | 8/1999 | Cass et al. | |
| 6,011,872 A | 1/2000 | Qian | |
| 6,141,441 A | 10/2000 | Cass et al. | |
| 6,457,651 B2 * | 10/2002 | Paul et al. | 235/494 |
| 6,542,260 B1 | 4/2003 | Gann et al. | |
| 6,850,352 B1 * | 2/2005 | Childers | 359/237 |
| 7,044,395 B1 | 5/2006 | Davis et al. | |
| 7,190,839 B1 * | 3/2007 | Feather et al. | 382/240 |
| 7,210,631 B2 * | 5/2007 | Sali et al | 235/462.04 |
| 7,229,025 B2 * | 6/2007 | Sussmeier et al. | 235/462.04 |
| 2002/0134841 A1 | 9/2002 | Oakeson et al. | |
| 2005/0285761 A1 | 12/2005 | Jancke | |
| 2006/0202470 A1 | 9/2006 | Simske et al. | |
| 2007/0051813 A1 * | 3/2007 | Kiuchi et al. | 235/462.09 |
| 2007/0143737 A1 * | 6/2007 | Huang et al. | 717/103 |

OTHER PUBLICATIONS

PCT International Search Report for Patent Application No. PCT/US2008/053647 (filed Feb. 12, 2008); Report issued Jun. 26, 2008.

* cited by examiner

*Primary Examiner*—Seung H Lee
*Assistant Examiner*—Christle I Marshall

(57) ABSTRACT

A multiple resolution readable color array printed for labeling or displayed electronically achieves readable data at multiple optical resolutions. The array has a hierarchy of cells, where cells at a lower level of resolution include spatially adjacent smaller cells at a higher level of resolution. Colors are encoded in redundant cells within the hierarchy so that overall color assigned to a lower resolution cell depends on the colors encoded in the included data cells at a higher resolution.

19 Claims, 8 Drawing Sheets

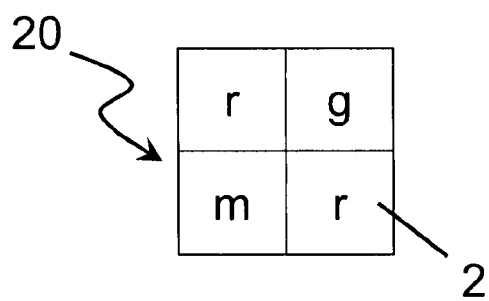
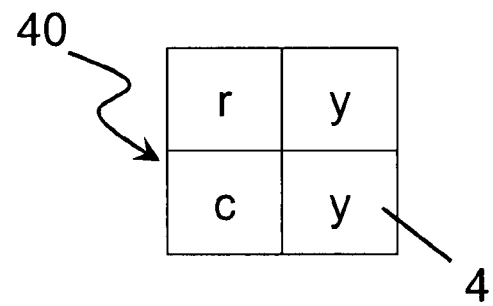
FIG. 1        FIG. 3
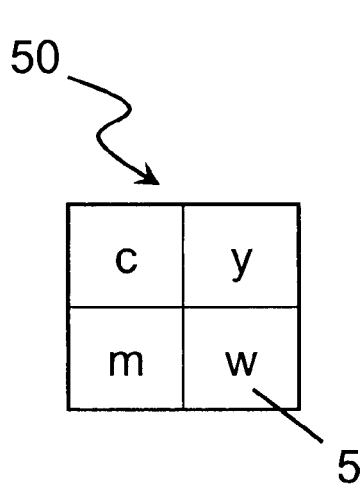
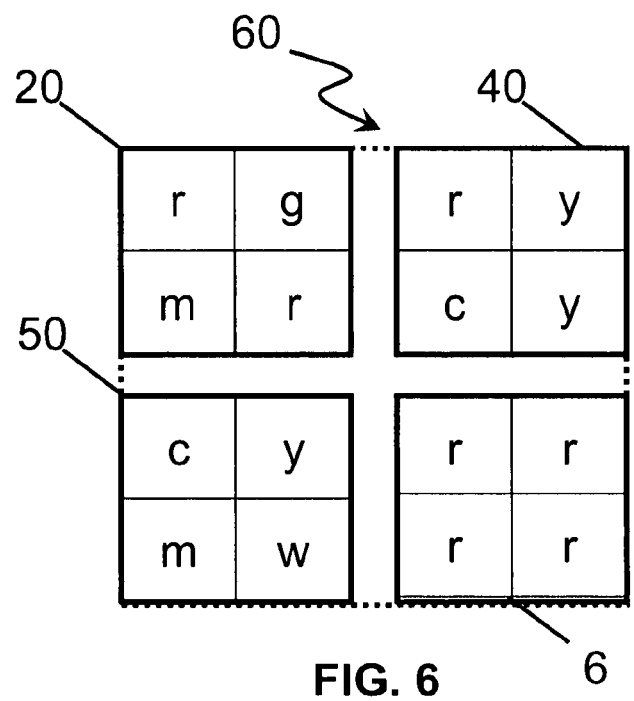
FIG. 2        FIG. 4
FIG. 5        FIG. 6

FIG. 9

| | | b | b | | | | | b | b | | | |
|---|---|---|---|---|---|---|---|---|---|---|---|---|
| | c | b | b | | c | c | | b | b | c | | |
| | | b | b | | | | | b | b | | | |
| | c | b | b | | c | c | | b | b | c | | |
| | | b | b | | | | | b | b | | | |
| | c | b | b | | c | c | | b | b | c | | |
| | c | b | b | | c | c | | b | b | c | | |
| | | b | b | | | | | b | b | | | |
| | c | b | b | | c | c | | b | b | c | | |
| | | b | b | | | | | b | b | | | |
| | c | b | b | | c | c | | b | b | c | | |
| | | b | b | | | | | b | b | | | |

FIG. 10

|   |   | b | y |   |   | b | y |   |   | b | y |
|---|---|---|---|---|---|---|---|---|---|---|---|
|   | c | b | y |   | c | b | y |   | c | b | y |
|   |   | b | y |   |   | b | y |   |   | b | y |
|   | c | b | y |   | c | b | y |   | c | b | y |
|   |   | b | y |   |   | b | y |   |   | b | y |
|   | c | b | y |   | c | b | y |   | c | b | y |
|   | c | b | y |   | c | b | y |   | c | b | y |
|   |   | b | y |   |   | b | y |   |   | b | y |
|   | c | b | y |   | c | b | y |   | c | b | y |
|   |   | b | y |   |   | b | y |   |   | b | y |
|   | c | b | y |   | c | b | y |   | c | b | y |
|   |   | b | y |   |   | b | y |   |   | b | y |

FIG. 11

|   |   | b | y | r | r |   |   | b | y | r | r |
|---|---|---|---|---|---|---|---|---|---|---|---|
|   | c | b | y | r | r |   | c | b | y | r | r |
|   |   | b | y | r | r |   |   | b | y | r | r |
|   | c | b | y | r | r |   | c | b | y | r | r |
|   |   | b | y | r | r |   |   | b | y | r | r |
|   | c | b | y | r | r |   | c | b | y | r | r |
|   | c | b | y | r | r |   | c | b | y | r | r |
|   |   | b | y | r | r |   |   | b | y | r | r |
|   | c | b | y | r | r |   | c | b | y | r | r |
|   |   | b | y | r | r |   |   | b | y | r | r |
|   | c | b | y | r | r |   | c | b | y | r | r |
|   |   | b | y | r | r |   |   | b | y | r | r |

MULTIPLE RESOLUTION READABLE COLOR ARRAY

BACKGROUND

The most commonly known tracking and tracing labels are the Universal Product Code (UPC) bar codes. Visual security printing measures, referred to herein as deterrents, are designed for authentication with a specific reader such as the bar code reader. Alternatively, some deterrents rely on a human observer for authentication such as holograms. However, authentication is a complicated process, dependent on print quality, resolution of the sensor, optics of the reader, and lighting conditions to name a few. Finally, deterrents may be verified with a reader that is capable of authenticating under most conditions. This results in either higher reader cost, or the ability to authenticate deterrents under various conditions.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 is a 2×2 color array encoded with a first content of data in accordance with an embodiment of the present invention;

FIG. 2 is a fully encoded 2×2 cell resulting from encoding color in the redundant tile of FIG. 1 in accordance with an embodiment of the present invention;

FIG. 3 is a 2×2 color array encoded with a second content of data in accordance with an embodiment of the present invention;

FIG. 4 is a fully encoded 2×2 cell resulting from encoding color in the redundant tile of FIG. 3 in accordance with an embodiment of the present invention;

FIG. 5 is a fully encoded 2×2 cell having a third content of data and redundancy in accordance with an embodiment of the present invention;

FIG. 6 is an encoded 4×4 cell resulting from encoding colors in spatial cells at two levels of hierarchy so that the overall color assigned to a 4×4 cell depends on the colors encoded in the included 2×2 cells in accordance with an embodiment of the present invention;

FIG. 9 is a partially encoded 12×12 cell organized as a 6×6 cell arrangement of 2×2 tile cells in accordance with an embodiment of the present invention;

FIG. 10 is the 12×12 cell of FIG. 8 encoded with blue cells for a 3×3 cell resolution in accordance with an embodiment of the present invention;

FIG. 11 is a partially encoded 12×12 color tile array organized as an arrangement of 2×2, 3×3, and 4×4 cells with colors encoded at the 4×4 level in accordance with an embodiment of the present invention;

FIG. 12 is a partially encoded 12×12 color tile array organized as an arrangement of 2×2, 3×3, 4×4, and 6×6 cells with colors encoded at the 6×6 level in accordance with an embodiment of the present invention; and FIG. 13 is indicative of a shipping label where black locator bars and boundary patterns have been added to the color tile array of FIG. 12 in accordance with an embodiment of the present invention.

DETAILED DESCRIPTION OF EXAMPLE EMBODIMENTS

Figure 7:
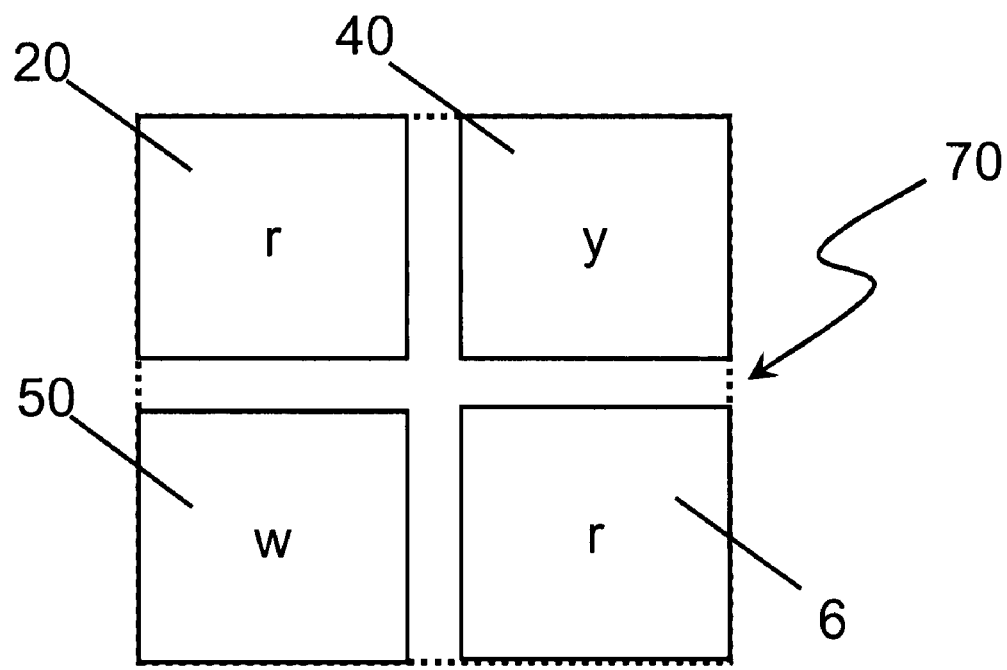
FIG. 7 is the encoded cell of FIG. 6 at a 2×2 cell lower resolution in accordance with an embodiment of the present invention.

In describing embodiments of the present invention, the following terminology will be used.

The singular forms "a," "an," and "the" include plural referents unless the context clearly dictates otherwise. Thus, for example, reference to "a cell" includes reference to one or more of such cells.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Reference will now be made to the exemplary embodiments illustrated, and specific language will be used herein to describe the same. It will nevertheless be understood that no limitation of the scope of the invention is thereby intended.

One embodiment of the present invention includes a scalable color tile array. The scalable color tile array may be, for example, printed for labeling or displayed electronically. The resolution at which information may be read from the array scales to the reading capabilities of the optical reader device. The array includes a hierarchy of cells, where cells at a lower level of resolution include spatially adjacent smaller cells at successively higher resolutions until, at the highest resolution possible, the smallest unit of information is the tile. At lower levels of resolution data is read from cells. Data can be encoded into one or more of the tiles at the lowest level (highest resolution) of the hierarchy. The encoding of data can be achieved, for example, by assigning a color to a tile, where colors map to data according to a predefined function. For example, a group of eight different colors (e.g., red, yellow, green, cyan, blue, magenta, white, and black) can map into three bits of information. Various predefined color mapping schemes can also be used in embodiments of the present invention. Also, position of a tile or a cell may provide additional information in the data stream.

In accordance with one embodiment of the present invention, colors are encoded in redundant cells within the hierarchy to enhance the overall color over a lower resolution cell depending on the colors of the included data cells at a higher resolution. For example, starting from the highest resolution and proceeding to the lowest resolution, redundant cells can be recursively encoded as chroma enhancing tiles and cells (CET). Therefore, the overall color assigned to lower resolution cells is based entirely on the data encoded at the highest resolution. In other words, colors encoded in an $n^{th}$ level cell in the hierarchy can be a predefined function of the colors encoded in the included data cells at the $(n-1)^{th}$ level in the hierarchy.

Data read from the scalable color array is a function of the reading resolution. For example, data errors can be generated when the overall color assigned to a cell contradicts the chroma sum of all the spatially adjacent cells included in that cell. The chroma sum, used in encoding the CET, can be iteratively checked at successively higher resolutions decoding data until an error in matching the CET is generated. Thus authentication is predicated on chroma enhancing cells encoded to bias the overall chroma of the higher resolution cells, which in turn contribute to the overall chroma in the lower resolution cell.

If the scalable color array is read at a lower resolution, reduced data is obtained, but the data is based on the data encoded at the highest resolution because of the redundant color encoding process described above. Information density accordingly scales to the quality of the image. Higher quality images can be read at full density while lower quality images can be read at reduced density. Thus, a diverse population of customers and devices can be used to provide point-to-point location provenance of an item. Lower information densities can be linked to higher densities in the supply chain or other point-to-point transmission paths. Therefore, a full provenance record can be obtained from constructing a 'credible' path from origin to end-user by finding readings that are consistent with the highest resolution at each expected checkpoint in the supply chain. Failure to have a credible read, at any resolution, at one or more checkpoints, indicates possible fraud. Graduated levels of information are thus provided for different parties along the transmission path from a single color array. Data encoded into the scalable color array may include, for example, product codes, manufacturing source, date codes, validation sequences, individual serial numbers, and the like.

A system according to one embodiment of the present invention includes optical scanners capable of reading the encoded cells from the color array and devices capable of checking the resulting data stream for read errors. More expensive scanners able to read at multiple resolutions may read data through multiple levels of the hierarchy. A multiplicity of less expensive scanners may be used to similarly read at multiple resolutions through the hierarchy. On the other hand, it may also be sufficient that a single scanner reading at a lower resolution provides sufficient data for authentication by the end-user to deter counterfeiting. Complete data providing a full provenance record may only be necessary at specific points in a track and trace utilization allowing economization of capital. Devices capable of scanning the array, checking for and generating read errors may also range from more expensive multifunction devices to a combination of less expensive single function devices. Devices such as camera phones, digital cameras, desktop scanners, and handheld scanners are all examples of the devices in which the embodiments of the present invention can be implemented.

Multi-resolution data encoding will be illustrated further through the following detailed examples. Accordingly, one embodiment of the present invention is a 2×2 color array encoded with a first content of data as illustrated in FIG. 1. Data is encoded using a red-green-blue (RGB) color system, although other color systems can be used, including for example cyan-yellow-magenta (CYM) and cyan-yellow-magenta-black (CYMK). The first content of data represented by red, magenta and green, is encoded into the three data cells labeled 'r', 'm' and 'g'. The fourth tile (1) is redundant and in this embodiment is used for chroma enhancement. The color that enhances the pure chroma sum of the three data cells is encoded in the CET. The data cell encoded red has a pure RGB chroma of 255 red, 0 green, and 0 blue. The data cell encoded magenta has a pure RGB chroma of 255 red, 0 green, and 255 blue. The data cell encoded green has a pure RGB chroma of 0 red, 255 green, and 0 blue. Therefore the pure chroma sum of the three data cells is 510 red, 255 green, and 255 blue. Since red is the maximum chroma sum of the data tiles, 255 red is encoded into the CET and the total of the four cells is now 765 red, 255 green, and 255 blue.

Encoding red in the redundant cell (2) of FIG. 1 results in the encoded 2×2 cell (20) of FIG. 2. Hence, if the array is scanned at reduced resolution, red will be the color that is translated from the image. Since the selection of the color for the chroma enhanced cell, and thus the peak chroma over the reduced resolution cell is based on the data, the data that is read at reduced resolution is entirely based on the data encoded. Thus, the chroma enhanced cell serves a function somewhat similar to parity check bits, for example, in a memory array. The inclusion of the chroma enhanced tile helps to ensure that a consistent color is reliably read when reading the color cell array at reduced resolution.

Likewise, in accordance with one embodiment of the present invention is another 2×2 color array encoded with a second content of data as illustrated in FIG. 3. The second content of data represented by the colors red, yellow and cyan, is encoded into the data cells labeled 'r', 'y' and 'c' in FIG. 3. Following the same method as used in FIG. 1 above, color is encoded in the redundant cell (4) to the color that enhances the pure chroma sum of the three data cells. The cell encoded red has a pure RGB chroma of 255 red, 0 green, and 0 blue. The cell encoded yellow has a pure RGB chroma of 255 red, 255 green, and 0 blue. The cell encoded cyan has a pure RGB chroma of 0 red, 255 green, and 255 blue. These three data tiles sum to a chroma of 510 red, 510 green, and 255 blue. RGB chroma in the 2×2 color tile array of FIG. 3. Since both red and green are the maximum chroma sum of the data tiles, 255 red and 255 green, or yellow is encoded into the CET and the total of the four cells is now 765 red, 765 green, and 255 blue. This encoding results in the 2×2 cell (40) of FIG. 4. Thus yellow can be read from this cell at a 1×1 resolution. At a higher resolution, all three data colors red, yellow and cyan can be read and checked against the chroma of the redundant cell to determine accuracy of the data.

Again, in accordance with one embodiment of the present invention is an encoded 2×2 cell (50) resulting from assigning color to a 2×2 color cell array encoded with a third content of data. The third content of data represented by cyan, magenta and yellow is encoded in the tiles labeled 'c', 'm', and 'y' as illustrated in FIG. 5. The cell encoded cyan has a pure RGB chroma of 0 red, 255 green, and 255 blue. The cell encoded magenta has a pure RGB chroma of 255 red, 0 green, and 255 blue. The cell encoded yellow has a pure RGB chroma of 255 red, 255 green, and 0 blue. Therefore there is a total of 510 red, 510 green, and 510 blue chroma in the three data cells of the 2×2 color cell array of FIG. 5. No pure chroma is predominant. In order that colors map to data according to a predefined function, white is encoded in the redundant cell (5) since it has an RGB chroma of 255 red, 255 green, and 255 blue. White enhances all additive colors equally. At the lower 1×1 cell resolution this cell's data would be read as white.

Encoding white in redundant cells and tiles allows double error detection. If the cyan tile were misread as blue, then the resulting chroma for the cell would read 510 red, 255 green, and 510 blue resulting in magenta for the redundant tile. Since the redundant tile is encoded white, an error would result. Should the magenta tile or the yellow tile be misread, the resulting chroma sum still results in an error generation. However, even should a double color misread occur and both magenta and yellow be misread as red, the resulting chroma would be 510 red, 255 green, and 255 blue and reading the redundant tile would still result in an error. With this approach, white is an emergent color possible for the redundant CET but not for data tiles.

FIG. 6 is an encoded 4×4 cell color array (60) resulting from arraying the 2×2 cells of FIGS. 2, 4, and 5 (offset in bold) and encoding colors in redundant cells in accordance with an embodiment of the present invention. At a lower resolution as depicted in FIG. 7, the overall color assigned to the FIG. 2 cell (20) is red, the overall color assigned to the FIG. 4 cell (40) is yellow (255 red, 255 green) and the overall color assigned to the FIG. 5 cell (50) is white. The composite chroma of red, yellow, and white is 765 red, 510 green, and 255 blue. Therefore the color red is encoded into the redundant cells of the lower right quadrant (6) of FIG. 6 so that the overall color translated from the 4×4 cell at the lowest resolution is red. No independent data is encoded at the lowest resolution, as the color assigned to the lower right quadrant is dependent on the encoded colors of the higher resolution.

FIG. 7 is the encoded array of FIG. 6 as may be read using lower 2×2 cell resolution in accordance with an embodiment of the present invention. The overall color assigned to each 2×2 cell is based on the colors encoded in the included cells at the 4×4 level resolution. The color array read at the 2×2 lower resolution (70) can be checked against higher resolution data. For example, reading the color array of FIG. 7 at a higher resolution should result in reading the color array of FIG. 6. However, if the magenta cell in the upper left quadrant (20) is misread as yellow the resulting chroma sum of the three data cells is read as 510 red, 510 green, and 255 blue. Thus the redundant 2×2 cell for that quadrant (20) is calculated to be yellow instead of red. This results in not only an error generation at the higher resolution, but also at the lower resolution since a yellow cell in the upper left quadrant (20) would require the redundant cell in the lower right quadrant (6) of FIG. 7 to also be yellow. Thus only the data at the 2×2 cell resolution is read correctly in this example. Extending this, cells can be iteratively checked at successively higher resolutions until an error in matching redundant cells is generated.

Figure 8:
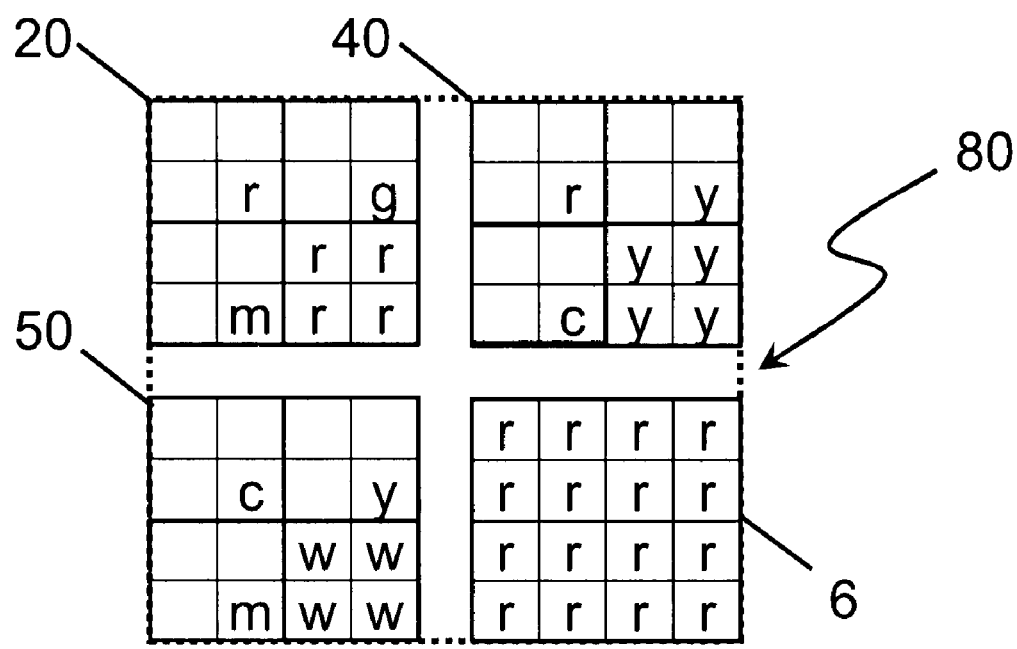
FIG. 8 is the cell of FIG. 6 partially encoded at an 8×8 cell higher resolution in accordance with an embodiment of the present invention.

FIG. 8 is a color array (80) identical to FIG. 6 but read at an even higher 8×8 resolution in accordance with an embodiment of the present invention. There are thus three levels of hierarchy or 3 optical resolutions depicted in FIG. 8. An optical reader at the lowest resolution reads FIG. 8 as depicted in FIG. 7, and at an intermediate resolution reads FIG. 8 as depicted in FIG. 6. The overall color assigned to the resulting 8×8 cell of FIG. 8 depends on the colors encoded in the included cells at the 4×4 level resolution which themselves depend on the colors encoded in the included 2×2 tiles. For brevity in illustration and explanation, data tile color is omitted at the highest resolution that would result in the fully encoded redundant tiles as illustrated in each 2×2 cell outlined in bold. The 2×2 redundant tile arrays are color encoded to enhance the overall color assigned to the combination of the three spatially adjacent cells. Red is encoded in the lower right quadrant tiles (6) since red enhances the overall color assigned to the combination of the three spatially adjacent 4×4 cells for reading the color array at the lowest resolution as depicted in FIG. 7.

Following the embodied method as illustrated in FIGS. 1 through 8, cells can be recursively scaled in size for the number of hierarchy levels desired. For example, the physical realization of FIG. 8 can readily scale to a 32×32 array, and to a 64×64 color array, for example. However, in another embodiment of the present invention, scaling at non-powers of two, such as at 2×2, 3×3, and 4×4 as depicted further below, provides increased flexibility relative to the resolving power of the capture device.

Figure 9:
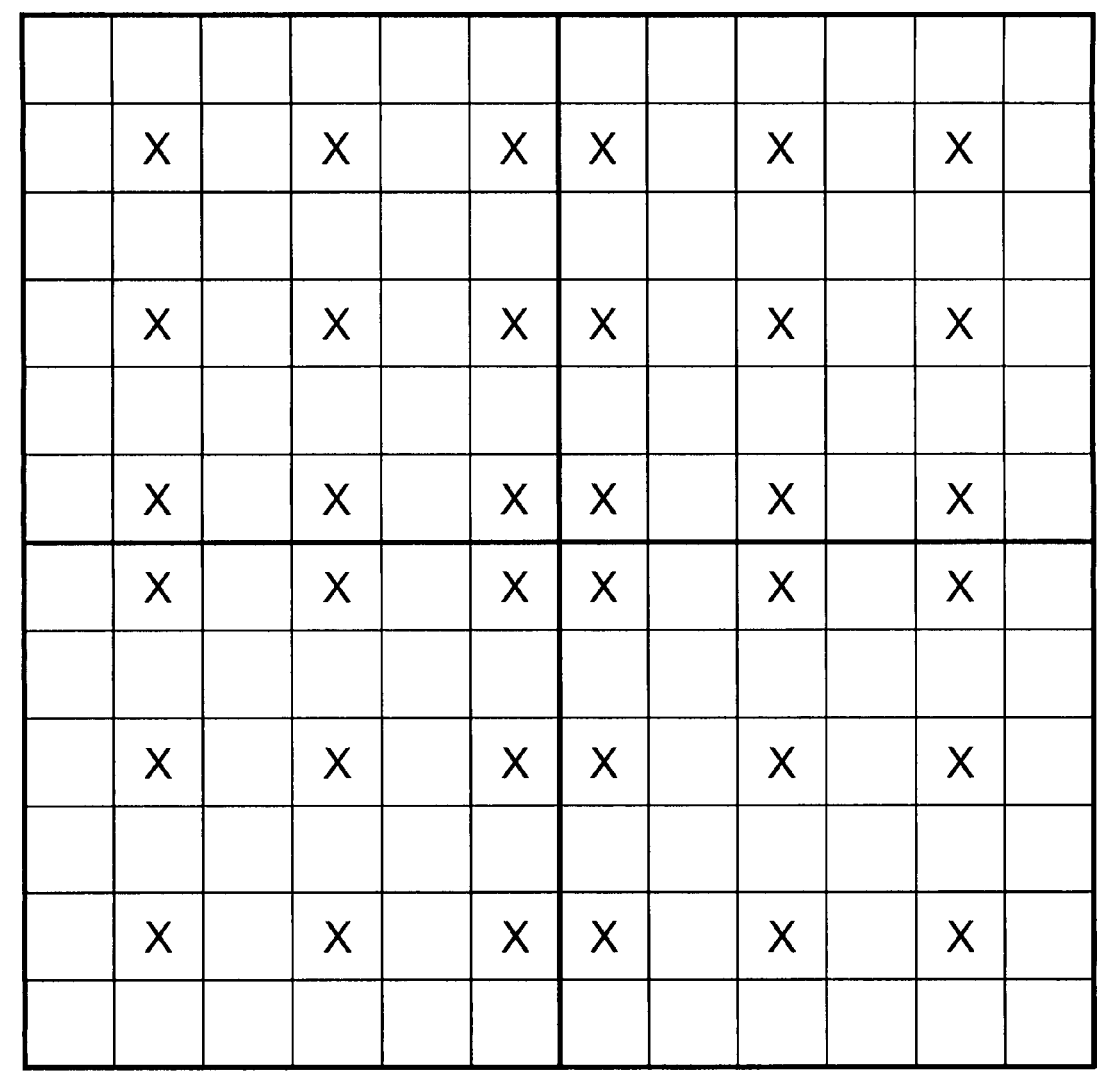

FIG. 9 is a 12×12 cell organized as a 6×6 cell arrangement of 2×2 tile cells in accordance with another embodiment of the present invention. For brevity in illustration and explanation, since data is omitted, the redundant tiles are depicted by an 'X' to represent unknown encoded color. Two by two cell boundaries are omitted in order to emphasize the 6×6 groups.

FIG. 10 is the 12×12 cell of FIG. 9 where successively larger cells scale from 2×2 cells to 3×3 cells in accordance with an embodiment of the present invention. Here the redundant tiles which are depicted 'X' in FIG. 9 are assumed cyan for brevity in discussion and illustration and are therefore marked 'c'. The cyan cells enhance the overall color assigned to the data cells in a 2×2 grouping (the actual color of each cyan cell being determined from the encoded data in the other cells within the 2×2 grouping). The blue cells marked 'b', are assigned colors to enhance the overall color assigned to the spatially adjacent data cells at the 3×3 level resolution outlined in bold (the actual color of each blue cell being determined from the encoded data in the other cells within the 3×3 grouping).

FIG. 11 is a 12×12 color tile array organized as an arrangement of 2×2, 3×3, and 4×4 cells with redundant cells encoded at the 4×4 level in accordance with an embodiment of the present invention. Again for brevity in illustration and explanation, encoded data is omitted that would result in the redundant colored cells as illustrated. The yellow cells marked 'y', are encoded to enhance the overall color assigned to the spatially adjacent cells at the 4×4 level resolution outlined in bold (the actual color of each yellow cell being determined from the colors of included cells within the 4×4 grouping).

FIG. 12 is a 12×12 color tile array organized as an arrangement of 2×2, 3×3, 4×4, and 6×6 cells with colors encoded at the 6×6 level in accordance with an embodiment of the present invention. Again for brevity in illustration and explanation, encoded data is omitted that would result in the redundant colored tiles as illustrated. Additionally, the red cells marked 'r', are encoded to enhance the overall color assigned to the spatially adjacent cells at the 6×6 level resolution outlined in bold (the actual color of each red cell being determined from the colors of included cells within the 6×6 grouping).

Figure 13:
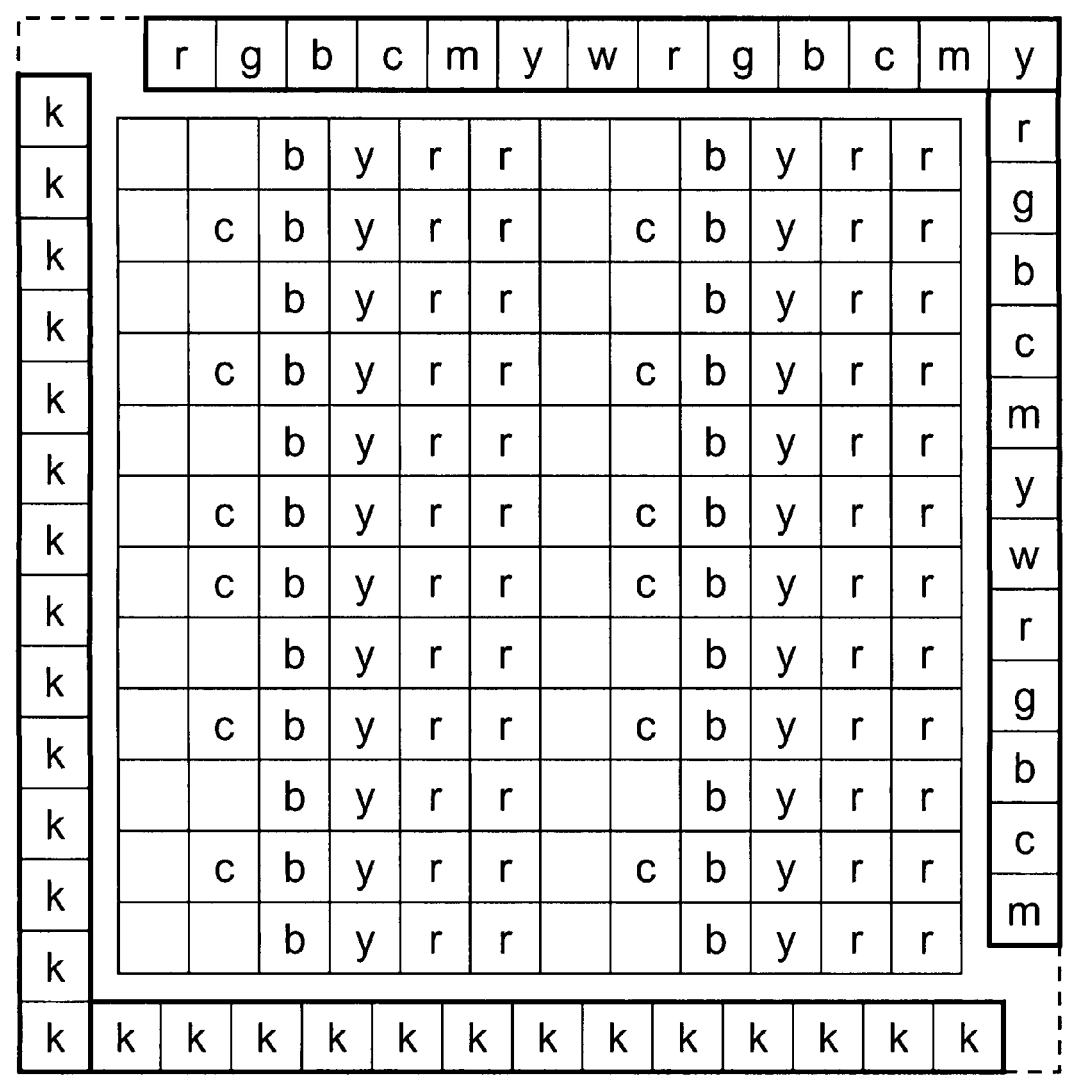

FIG. 13 is indicative of a shipping label where black locator bars and boundary patterns have been added to the color tile array of FIG. 12 in accordance with an embodiment of the present invention. These boundary locators offset in bold print, assist in authenticating and correcting the color array for rotation, warping and other errors. The black locator bars are encoded in tiles labeled 'k' at the left and bottom boundaries of the array. The boundary patterns are encoded at the right and top of the array and include the possible colors that can be encoded into tiles and cells. However, in accordance with additional embodiments of the present invention, the locator bars and boundary patterns may comprise alternate colors, alternate positions within the array, or both. In general, they are selected to improve authentication accuracy.

Figure 14:
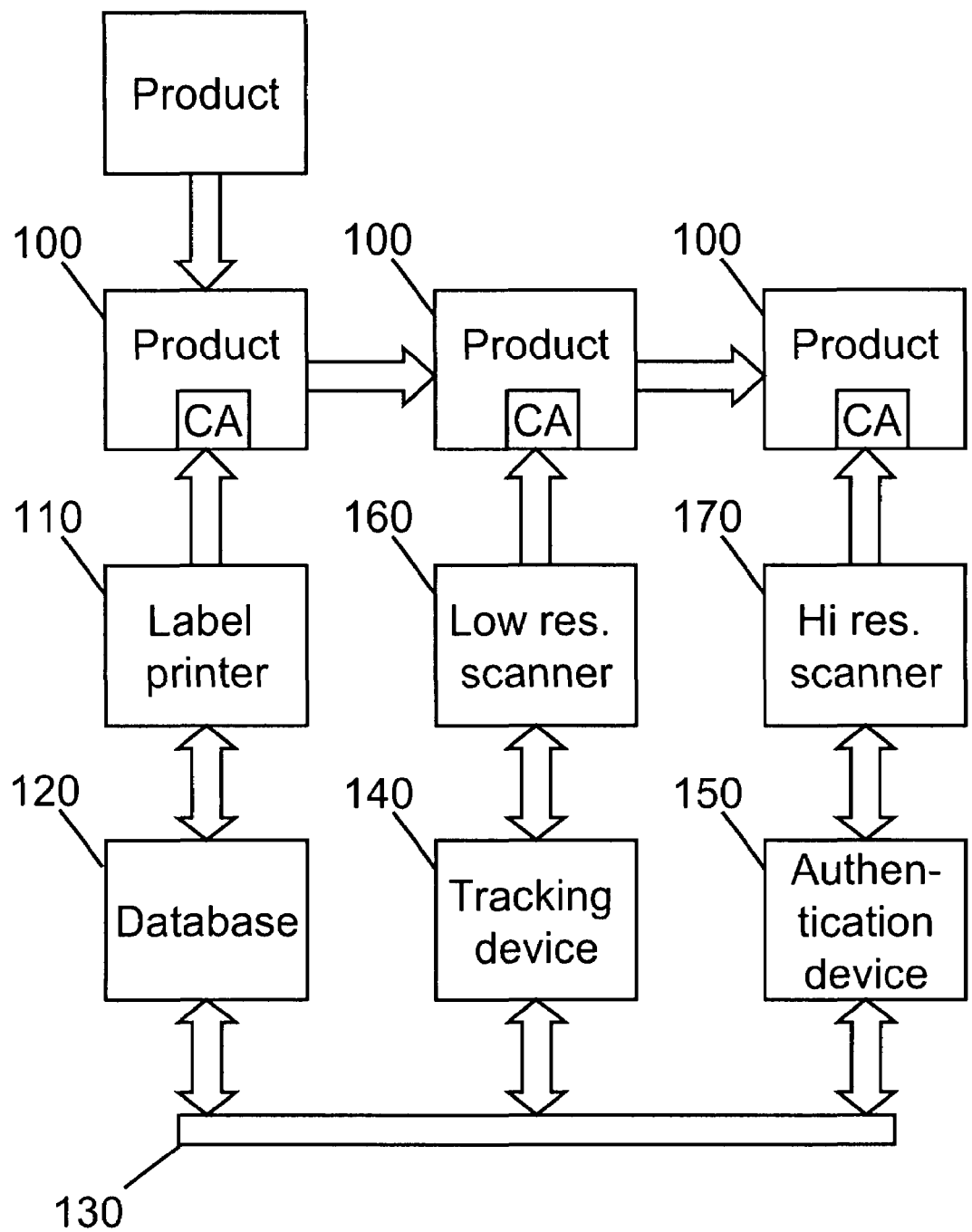
FIG. 14 represents a system for encoding and reading data from a color tile in accordance with an embodiment of the present invention.

FIG. 14 represents a system in accordance with an embodiment of the present invention. The system includes a multiple resolution readable color array depicted 'CA' printed as a label to affix to a target item (100) or printed directly on the target item by a label printer (110). A database (120) comprises authentication codes, product serial numbers, and track and trace information to be encoded into the color array. Consequently, the database (120) can be connected through a bi-directional communication link (130) with a tracking device (140), and an authentication device (150) as depicted. A utilization device may be comprised of the tracking device (140) and the authentication device (150).

The database (120) communicates information to be encoded in the color array to the label printer (110). The tracking device (140) can drive or include a low resolution scanner (160) which reads the color array 'CA' on the product (100). The tracking device (140) can communicate information about the product to the database (120) and the authentication device (150) to detect counterfeiting and to create a provenance record of the product. The authentication device (150) may be located at the end-user or along the trace and track supply chain and can drive or include a high resolution scanner (170). An optical reader may be comprised of the low resolution scanner (160) and the high resolution scanner (170). The high resolution scanner (170) can read the color array 'CA' and communicate scanned data to the authentication device (150) for processing. The authentication device (150) can communicate provenance information and validate product authenticity across the bi-directional link (130) with the tracking device (140) and the database (120).

In accordance with an embodiment of the present invention, the color array may be displayed electronically on an electronic display medium such as a CRT, an LCD, a Plasma display, an LED display, a Surface-conduction electron-emitter display, a Field emission display (FED), a Nano-emissive display (NED), a flexible display or combinations thereof.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of generating an encoded color array with data readable at multiple optical resolutions, comprising:
    defining a color array having a hierarchy of cells, where cells at a lower level of resolution include a plurality of spatially adjacent smaller cells at a higher level of resolution;
    encoding the data into at least one cell at a highest level of resolution by assigning a color to the at least one cell to create a data cell; and
    encoding colors in redundant cells within the hierarchy so that overall color assigned to a lower resolution cell depends on the chroma sum of the included data cells at a higher resolution.

2. The method of claim 1 further comprising assigning colors to redundant cells at multiple levels of the hierarchy so that overall color assigned to an $n^{th}$ level cell is based on the colors encoded in the included data cells at the $(n-1)^{th}$ level of hierarchy.

3. The method of claim 2 wherein each $n^{th}$ level cell includes $2^n$ cells at the $(n-1)^{th}$ level.

4. The method of claim 1 wherein the smallest cells within the hierarchy are color tiles.

5. The method of claim 4 wherein the color tiles include data tiles each having a color assigned thereto to encode data according to a predefined function.

6. The method of claim 1 wherein the redundant cells at a given level of hierarchy enhance the overall color assigned to all included cells at the same resolution.

7. The method of claim 1 wherein overall color assigned to a lower resolution cell depends on the overall color assigned to the included data cells at a higher resolution.

8. The method of claim 1 further comprising encoding boundary locators to the color array to assist in authenticating and correcting the color tile array for rotation, warping, and other errors.

9. The method of claim 1 further comprising printing the color array onto a target item.

10. The method of claim 1 further comprising printing the color array as a label to affix to a target item.

11. The method of claim 1 further comprising displaying the color array onto an electronic display medium.

12. The method of claim 11 wherein the electronic display medium is chosen from the group consisting of a CRT, an LCD, a Plasma display, an LED display, a Surface-conduction electron-emitter display, a Field emission display (FED), a Nano-emissive display (NED), a flexible display or combinations thereof.

13. The method of claim 1 further comprising selecting a color scheme enabling the detection of double read errors for at least one optical resolution.

14. A method of checking data consistency across multiple cells in a color tile array printed as a label or displayed electronically, comprising:
    reading data from a color tile array having a hierarchy of cells, where cells at a lower level of resolution include a plurality of spatially adjacent smaller cells at a higher level of resolution;
    generating an error where the overall color assigned to a lower resolution cell does not match the overall color assigned to all the higher resolution cells included in the lower resolution cell; and
    iteratively checking at successively higher resolutions until an error occurs.

15. The method of claim 14 further comprising:
    reading data from the color tile array at the highest level of resolution, where cells include one or more redundant tiles and a plurality of spatially adjacent data tiles; and
    generating an error where the overall color assigned to the redundant tile does not match the overall color assigned to all the data tiles included in the cell.

16. A system for the encoding and reading of data from a color tile array printed as a label or displayed electronically, readable at multiple resolutions, comprising:
    an optical reader being configured to scan and capture color cells in an array, wherein the color tile array has a hierarchy of cells and cells at a lower level of resolution include a plurality of spatially adjacent smaller cells at a higher level of resolution; and
    a utilization device being configured to receive data from the optical label reader and being configured to perform error checking of the encoded tiles based on a predefined relationship between overall color of a lower resolution cell and colors encoded of the included data cells at a higher resolution.

17. The system of claim 16, further comprising a first optical reader reading at a first resolution and a second optical reader reading at a second resolution.

18. The system of claim 16, wherein the optical reader and the utilization device are the same unit.

19. The system of claim 16, wherein the unit is a camera phone, a digital camera, a desktop scanner, a handheld scanner, or combinations thereof.

* * * * *

UNITED STATES PATENT AND TRADEMARK OFFICE
CERTIFICATE OF CORRECTION

| | |
|---|---|
| PATENT NO. | : 7,673,807 B2 |
| APPLICATION NO. | : 11/709407 |
| DATED | : March 9, 2010 |
| INVENTOR(S) | : Steven J. Simske et al. |

It is certified that error appears in the above-identified patent and that said Letters Patent is hereby corrected as shown below:

In column 10, line 1, in Claim 19, delete "claim 16," and insert -- claim 18, --, therefor.

Signed and Sealed this

Twenty-fourth Day of August, 2010

David J. Kappos
*Director of the United States Patent and Trademark Office*